United States Patent
Volkening et al.

(10) Patent No.: US 9,678,904 B2
(45) Date of Patent: Jun. 13, 2017

(54) PCI EXPRESS DATA TRANSMISSION

(71) Applicant: LANTIQ DEUTSCHLAND GMBH, Neubiberg (DE)

(72) Inventors: Ingo Volkening, Singapore (SG); Bing Tao Xu, Singapore (SG); Chuan Hua Lei, Singapore (SG)

(73) Assignee: Lantiq Deutschland GmbH, Neubiberg (DE)

(*) Notice: Subject to any disclaimer, the term of this patent is extended or adjusted under 35 U.S.C. 154(b) by 398 days.

(21) Appl. No.: 14/447,653

(22) Filed: Jul. 31, 2014

(65) Prior Publication Data
US 2015/0039804 A1    Feb. 5, 2015

Related U.S. Application Data

(60) Provisional application No. 61/861,470, filed on Aug. 2, 2013.

(51) Int. Cl.
*G06F 13/28* (2006.01)

(52) U.S. Cl.
CPC .................. *G06F 13/28* (2013.01)

(58) Field of Classification Search
CPC ......................................... G06F 13/28
USPC ........................ 710/307, 308, 29, 30, 35
See application file for complete search history.

(56) References Cited

U.S. PATENT DOCUMENTS

| | | | | |
|---|---|---|---|---|
| 5,590,378 A | * | 12/1996 | Thayer | G06F 13/28 710/30 |
| 5,687,328 A | * | 11/1997 | Lee | G06F 13/4013 710/307 |
| 5,983,305 A | * | 11/1999 | Szczepanek | G06F 13/4018 709/250 |
| 7,243,172 B2 | * | 7/2007 | Oner | G06F 13/4018 710/307 |
| 7,373,437 B2 | * | 5/2008 | Seigneret | G06F 13/28 709/212 |
| 8,312,190 B2 | * | 11/2012 | Wang | G06F 13/387 370/392 |
| 2004/0123013 A1 | | 6/2004 | Clayton et al. | |
| 2006/0271721 A1 | * | 11/2006 | Beukema | G06F 13/4013 710/307 |
| 2007/0263629 A1 | | 11/2007 | Cornett et al. | |
| 2008/0123638 A1 | * | 5/2008 | Liao | G06F 13/4295 370/389 |
| 2008/0195781 A1 | * | 8/2008 | Kim | G06F 13/387 710/105 |
| 2008/0294799 A1 | * | 11/2008 | Ward | G06F 13/385 710/1 |
| 2013/0082851 A1 | * | 4/2013 | Pardo | H03M 7/3088 341/106 |

OTHER PUBLICATIONS

"PCIe-DMA ConfigFPGA Design User Interface Manual Rev. 1.19"; Aug. 27, 2012, p. 1-30.

* cited by examiner

*Primary Examiner* — Glenn A Auve
(74) *Attorney, Agent, or Firm* — Eschweiler & Potashnik, LLC

(57) ABSTRACT

PCIe devices and corresponding methods are provided wherein a length of data to be transferred is aligned to a multiple of a double word length.

14 Claims, 8 Drawing Sheets

PCI EXPRESS DATA TRANSMISSION

CROSS-REFERENCE TO RELATED APPLICATIONS

This application claims the benefit of U.S. provisional application No. 61/861,470 filed Aug. 2, 2013.

TECHNICAL FIELD

The present application relates to data transmission via PCI express (Peripheral Component Interconnect express). For example, the present application may relate to corresponding devices or methods.

BACKGROUND

PCI express (PCIe) is a high-speed serial computer expansion bus standard designed to couple for example periphery devices with a chipset of a main processor (e.g. CDU). The PCI express electrical interface is also used in a variety of other standardized interfaces, for example in ExpressCard which is a laptop expansion card interface and in SATA Express which is a computer storage interface. PCI express essentially defines separate serial point-to-point connections. Separate endpoints may be coupled via switches. This enables an establishment of direct couplings between PCI express devices.

Applications running at higher layers on top of PCI express, for example applications related to a peripheral device, may use various data unit sizes, for example various frame sizes or various packet sizes. Conventional implementations of PCI express and point devices read an exact amount of data available over a bus. Such data units may be not aligned with double words (DWORDS) used in PCI data transfer. In some cases, this may lead to performance losses.

DETAILED DESCRIPTION

Figure 1:
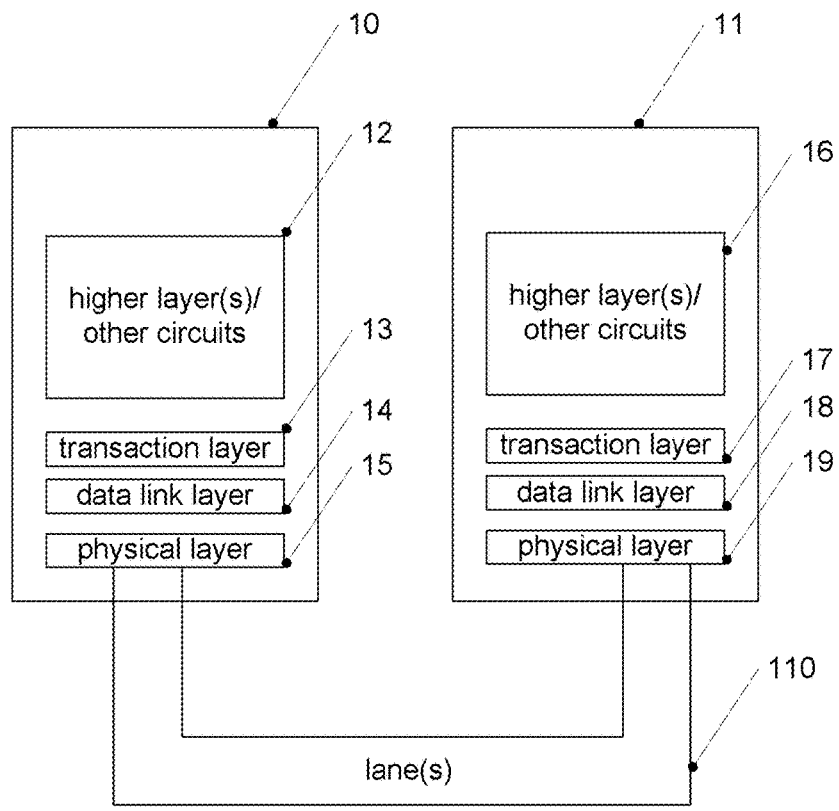
FIG. 1 is a schematic diagram of a PCI system according to an embodiment.

In the following, various embodiments will be discussed in detail with reference to the attached drawings. It should be noted that the embodiments shown in the drawings or described herein serve merely as illustrative examples and are not to be construed as limiting. For example, while embodiments may be described comprising a plurality of features or elements, in other embodiments some of these features or elements may be omitted and/or replaced by alternative features or elements. In other embodiments, additional features or elements may be provided. Features from different embodiments may be combined with each other to form further embodiments unless noted otherwise.

Any direct connection or couplings between elements shown in the drawings or described herein may be a direct connection or coupling, i.e. a connection or coupling without additional intervening elements, or an indirect connection or coupling, i.e. a connection or coupling with one or more intervening element, as long as the basic function of the connection or coupling, for example to transmit a certain kind of information or a certain kind of signal, is essentially maintained.

Embodiments relate to PCI express devices. Any terminology used herein is intended to have the meaning commonly used in the art of PCI express devices, for example as defined in various applicable PCI express standards, unless noted otherwise. PCI express devices may be devices having or using an interface based on PCI express, including e.g. ExpressCard devices or SATA Express devices.

Turning now to the figures, in FIG. 1 an embodiment of a PCIe communication system is illustrated. In FIG. 1, a first PCIe device 10 is shown as communicating with a second PCIe device 11 via one or more lanes 110. In some embodiments, each of one or more lanes 110 comprises a first differential line, for example a first twisted pair, for transmitting data from device 10 to device 11 and a second differential line, for example second twisted pair, for communication from PCIe device 11 to PCIe device 10. One or more lanes 110 connecting PCIe devices 10 and 11 are also referred to as a link. In other systems, more than two PCIe devices may be involved, and switches may be used to route data between desired PCIe devices.

For example, PCIe device 10 may be an endpoint device, and PCIe device 11 may be a PCIe host device, or sometimes also referred to as root complex. In other embodiments, communication may be between two PCIe endpoints.

First PCIe device 10 comprises a transaction layer 13, a data link layer 14 and a physical layer 15. Second PCIe device 11 comprises a transaction layer 17, a data link layer 18 and a physical layer 19. These layers in some embodiments may essentially be defined or implemented as in conventional PCIe devices.

Furthermore, PCIe device 10 comprises one or more higher layers or other circuits 12 to implement a desired functionality of PCIe device 10 and/or techniques disclosed herein, and PCIe device 11 comprises one or more higher layers or other circuits 16 to implement a desired functionality of PCIe device 11 and/or techniques disclosed herein.

The PCIe functionality, i.e. communicating for example according to a PCIe standard or PCIe related standard, is implemented by layers 13 to 15 in PCIe device 10 and by layers 17 to 19 of PCIe device 11. Apart from differences discussed below in more detail, communication may essentially be a standard PCIe communication.

Physical layer 15 or 19 corresponds to the physical implementation of the PCIe interface and may be divided into two sub-layers corresponding to electrical and logical specification. Physical layer 15 or 19 may include for example a next switch.

Data link layer 14 or 18 sequences transaction layer packets (TLPs) received from the transaction layer 13 or 17, respectively, ensures reliable delivery of transaction layer packets between two PCIe endpoints, for example between devices 10 and 11, via an acknowledgement protocol and initializes and manages flow control credits in some embodiments. Transaction layer 13 or 17 transports payload data between a logic transmitter and receiver (for example between circuits 12 and 16) disregarding for example switches therebetween. In the transaction layers 13 or 17, for example transaction layer packets (TLPs) may be formed.

The above is only intended to be a short overview over the functioning of the layers, and any functionalities known in the art of PCI express devices may be implemented.

As mentioned, the transaction layer 13 or 17 for transmitting data generates a third transaction layer packet (TLPs) which comprises a plurality of 32 bit words, also referred to a DWORDS (double words) in the following. A TLP may comprise a header which may e.g. be three of four DWORDs long and one or more DWORDs containing actual data, for example data to be written.

Figure 2:
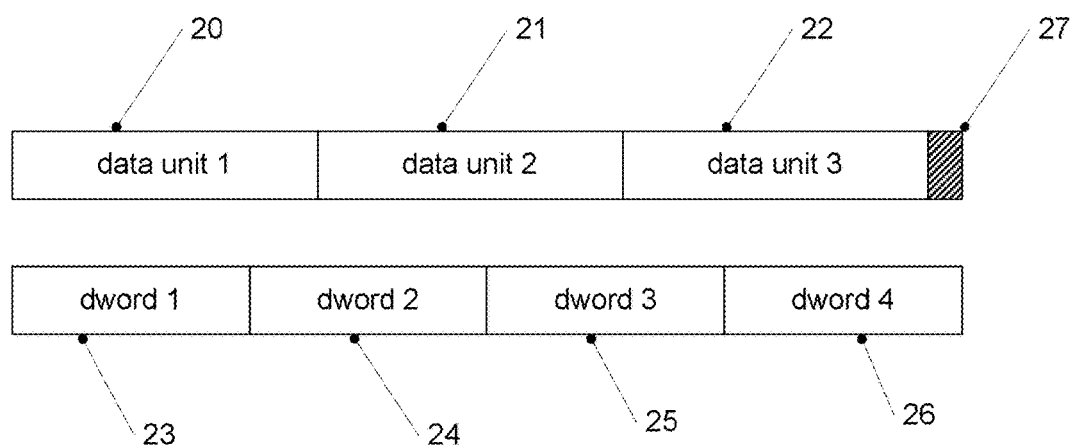
FIG. 2 illustrates DWORD alignment.

For example, when transmitting data, transaction layer 13 receives data to be written (transmitted) from higher layers or other circuits 12. Higher layers or other circuits 12 may use data units which are not aligned with DWORDs, for example having a length not corresponding to an integer number of DWORDs. Such data units may for example be frames or packets. In embodiments, transaction layers 13, 17 or an entity above transaction layers 13, 17 within PCIe device 10 in case of a misalignment adds for example additional data, e.g. dummy data, such that data to be written is aligned with a DWORD. After transmitting the data, this additional data may be removed again or refrained from being processed. Similar techniques may be employed when receiving data. In some embodiments, after the data transfer, an associated data descriptor used for the transfer does not include the extra data like extra bytes or extra bits such that further processing stages processing received data disregard the additional data A schematic example for such an alignment is illustrated in FIG. 2. In the example of FIG. 2, three data units 20 to 22 are provided, e.g. by a high layer. The length of the three data units 20 to 22 in the example of FIG. 2 is longer than the length of three DWORDs 23 to 25, but shorter than the length of four DWORDs 23 to 26, i.e. misaligned with DWORD length. In some embodiments, additional bits or bytes 27 are inserted as dummy data such that the length is aligned. For example, as a DWORD comprises 32 bits corresponding to four bytes, and data units like data units 20 to 23 in FIG. 2 often comprise an integer number of bytes, additional dummy data 27 may comprise one, two or three bytes in some embodiments. It should be noted that the relative length and numbers of data units and DWORDs in FIG. 2 is merely an example, and other relationships, including data units being shorter than DWORDs, are also possible. The alignment may be a dynamic alignment in some embodiments, e.g. continuously adapted to data to be transferred.

In some embodiments, by such an DWORD length adjustment a transfer initiated by a PCI express endpoint may be enhanced. While in some embodiments in case of non-DWORD length aligned data as illustrated in FIG. 2, some extra bytes or bits would be read or written, in some embodiments, this, nevertheless, may accelerate overall data transfer. In some embodiments, buffer stages of a PCI express host system as well as the endpoint may be designed to accept up to a maximum transfer size, and therefore the alignment according to techniques disclosed herein may be implemented without significant hardware changes in some embodiment.

Figure 3:
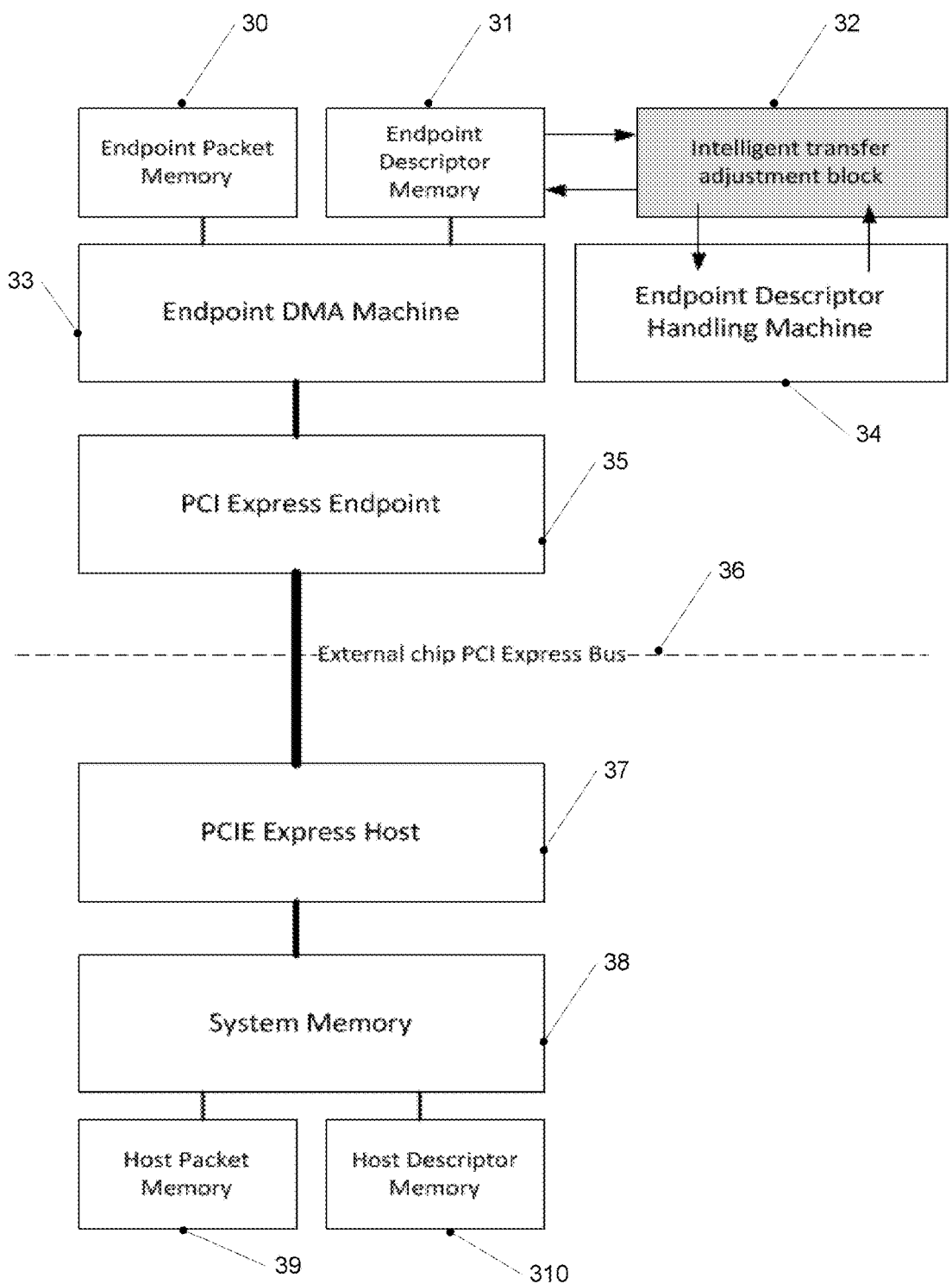
FIG. 3 illustrates a detailed block diagram of a device according to an embodiment.

In FIG. 3, an example architecture of a system embodiment is illustrated. The system of FIG. 3 illustrates a communication of a PCI endpoint device (elements 30 to 35) with a host device (elements 37 to 310) or root complex. The endpoint device may for example comprise a peripheral, and the host device may include a PCI chip set and/or a central processing unit (CPU) of a computer. In other embodiments, other devices may be used communicating according to PCI express or a PCI express-based standard.

The PCIe endpoint device comprises a PCIe endpoint 35, for example hardware associated with transmitting or receiving data, an endpoint direct memory access (DMA) machine 33 to initiate and perform data transfers, an endpoint descriptor handling machine 34, an endpoint packet memory 30, an endpoint descriptor memory 31 and an intelligent transfer adjustment block 32. Apart from intelligent transfer adjustment block 32 and its interaction with the other components, the endpoint device may be implemented in any conventional manner using hardware, software, firmware or combinations thereof. Various functions described in the following of the components illustrated in FIG. 3 may be implemented using hardwired logic and/or one or more correspondingly programmed processor. Memories 30, 31 may be implemented as separate memories (for example random access memory (RAM)) or any other conventional memory) or may be implemented as a common memory. Generally, describing devices in terms of various blocks, machines, circuits etc. is not to be construed as indicating that these elements have to be implemented in a physically separate manner.

The host device comprises a PCIe host hardware 37, a system memory 38, a host packet memory 39 and a host descriptor memory 310 and may be implemented in a conventional manner.

In the embodiment of FIG. 3, for non-DWORD length aligned data units like packets or frames, intelligent transfer adjustment block 32 may calculate a next DWORD aligned length and adjust a transfer descriptor used by endpoint DMA machine 33. For the data inside the endpoint device, the intelligent transfer adjustment block 32 may present an actual data unit length to a next processing stage to stay in conformalty to the requested transfer, i.e. additional data (dummy data) added may be discarded again. A descriptor on the host device side, for example stored in host descriptor memory 310, may be kept to an original length of a data unit in embodiment. In some embodiments, in this way a data transfer may be fully conformed to a desired transfer, but performance may be improved in some embodiments. PCIe devices using techniques disclosed herein may communicate with legacy devices, e.g. hosts.

Figure 4:
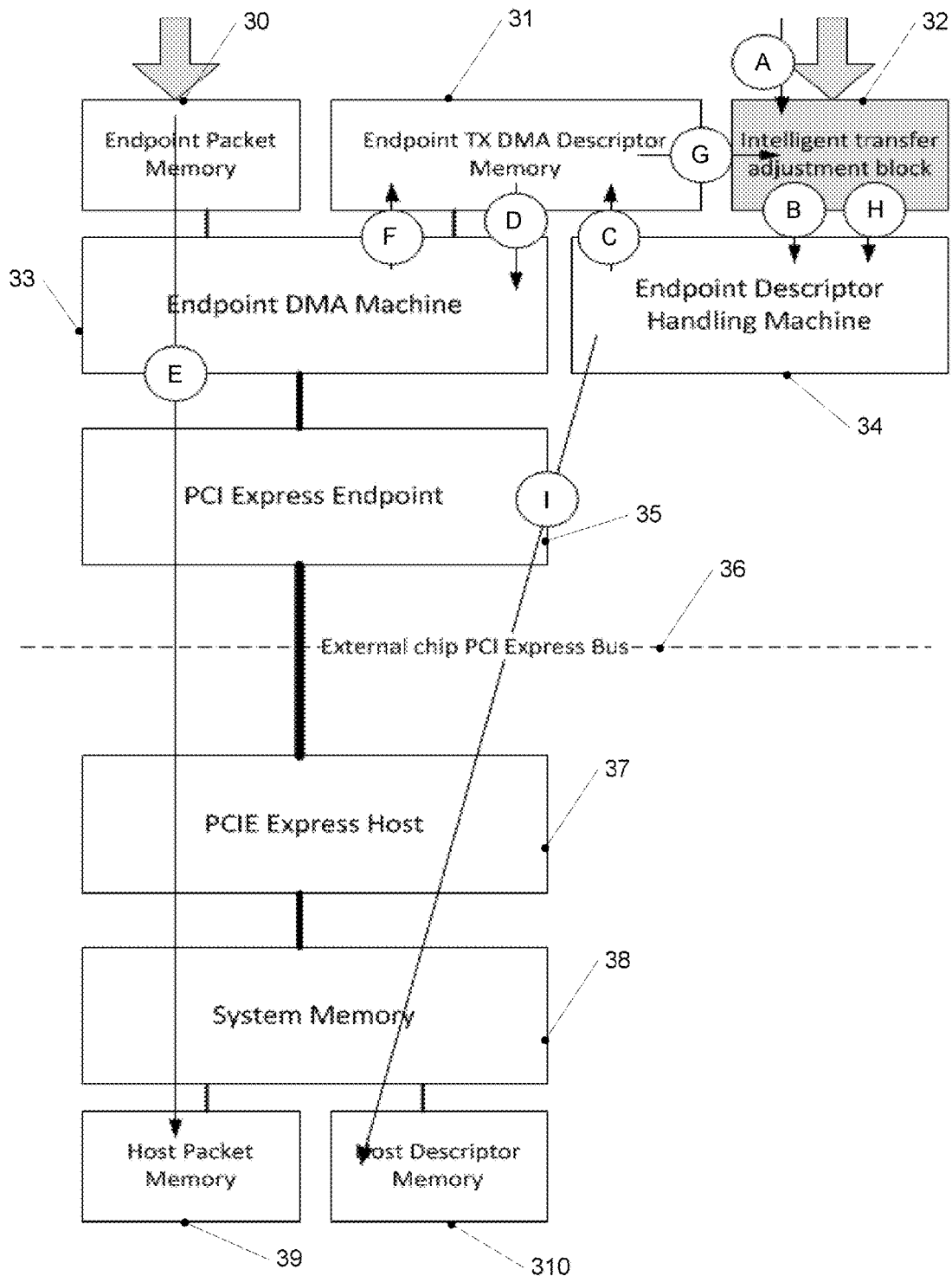
FIG. 4 illustrates operation of the embodiment of FIG. 3 when transmitting data.
Figure 6:
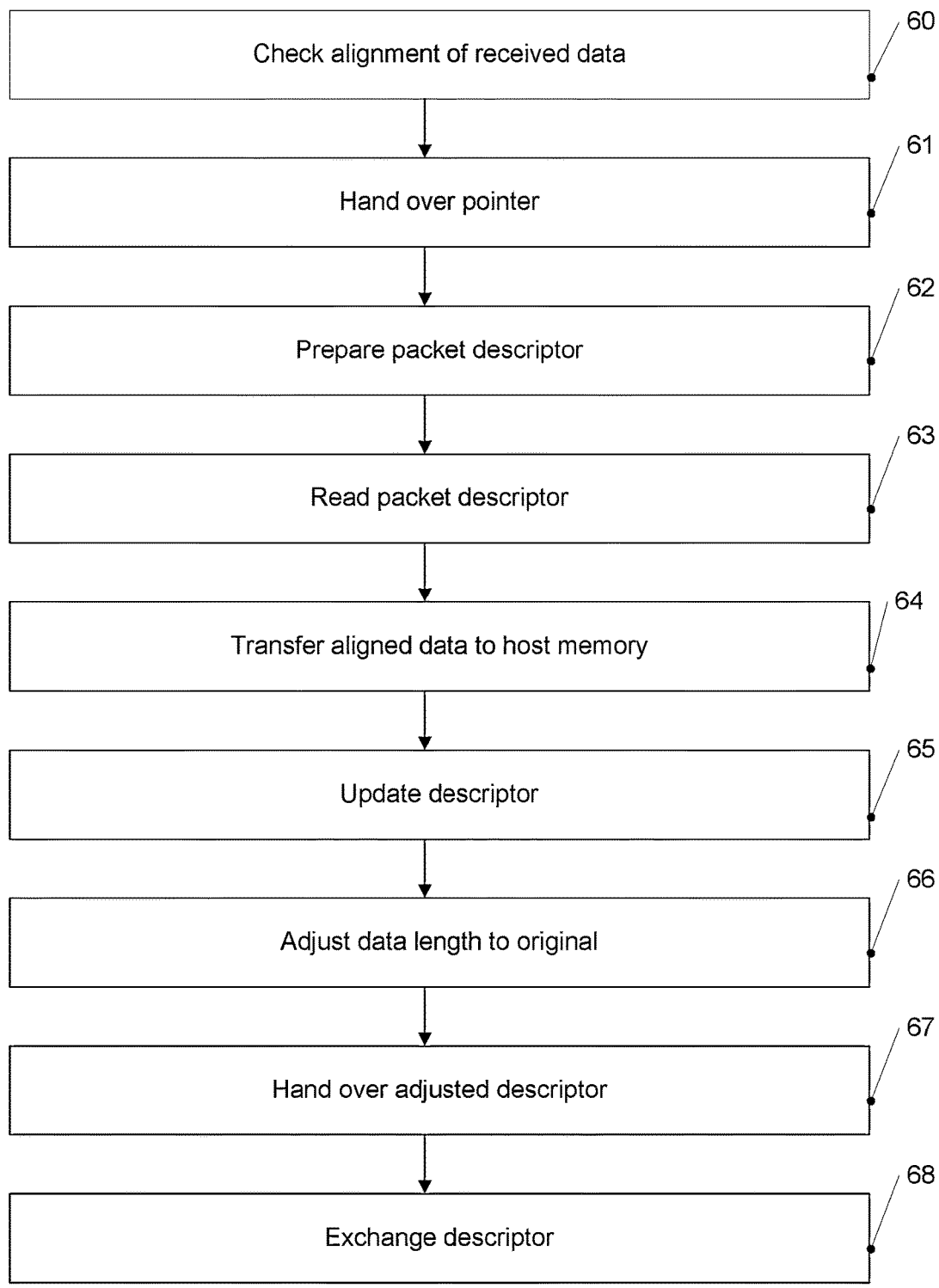
FIG. 6 illustrates an embodiment of a method for transmitting data.

Next, a data flow for transmitting data from endpoint to host will be illustrated with reference to FIGS. 4 and 6. FIG. 4 illustrates the system of FIG. 3 with arrows denoted A-I. FIG. 6 illustrates a method according to an embodiment which may be implemented in the system of FIGS. 3 and 4. However, the method of FIG. 6 may also be implemented in other devices. Moreover, while the method of FIG. 6 is shown and described as a series of acts or events 60 to 68, in other embodiments other orders of these acts or events may be used, some acts or events may be omitted, and/or acts or events may be implemented essentially simultaneously. When applied to the system of FIG. 3, acts 60 to 68 may correspond to arrows A-I in FIG. 4, as explained in the following in detail. For better illustration, the method of FIG. 6 will be described referring to FIG. 4.

At 60 in FIG. 4, as symbolized by an arrow A in FIG. 4, intelligent transfer adjustment block 32 receives data from previous processing stages in the endpoint device, for example higher layers or other circuits as indicated by 12 or 16 in FIG. 1. Intelligent transfer adjustment block 32 then checks an alignment of the received data (for example data to be transferred), i.e. check if the data is aligned with DWORDs. If an alignment is necessary, the intelligent transfer adjustment block 32 may align the data by adjusting a pointer to the next DWORD length aligned address in a memory where the data is stored, plus adding additional data, for example 1 to 3 bytes, as discussed with reference to FIG. 2. The pointer may be provided in a descriptor.

At 61, this pointer is handed over to endpoint descriptor handling machine 34, as indicated by an arrow B in FIG. 4.

Next, at 62, the endpoint descriptor handling machine 34 prepares a packet descriptor for endpoint DMA machine 33, and stores it in memory 31, which in this case serves for storing transmission (TX) DMA descriptors. This is indicated by an arrow C in FIG. 4.

At 63, as indicated by an arrow D in FIG. 4, endpoint DMA machine 33 reads the descriptor from memory 31. Next, as indicated by an arrow E, the data, which is now aligned to DWORD length, is transferred via the PCIe link to packet memory 39 on the host side. This is indicated by arrow E in FIG. 4.

The transferring of the aligned data may be essentially performed by conventional PCIe techniques using transfer layer, data link layer and physical layer. For example, the aligned data may be used to form transaction layer packets (TLPs), which may then be processed normally. The functions implemented by intelligent transfer adjustment block 32 may be implemented in a layer above the transaction layer.

After the transfer at 64, at 65, DMA machine updates the descriptor stored in descriptor memory 31 corresponding to the transmission of data, as indicated by an arrow F in FIG. 4. For example, the descriptor may be updated with information regarding the fact that data has been transferred.

Next, at 66, the transfer adjustment block 32 modifies this descriptor to adjust data length back to the original length without the added data for alignment. In other words, the descriptor after this adjustment describes the transferred data as if it were transferred without the additional data, for example additional bytes. This is indicated by arrow G in FIG. 4.

At 67, the just adjusted descriptor is handed over to the endpoint descriptor handling machine 34, as indicated by arrow H in FIG. 4. At 61, endpoint descriptor handling machine 34 then exchanges the descriptor with the host side, such that the descriptor is for example stored in host descriptor memory 310. This exchange may be performed as in conventional systems.

In some embodiments, by providing the adjusted descriptor corresponding to the original length, e.g. without the added dummy data, the transfer of the dummy bytes is transparent for blocks, devices or layers handling the data subsequently, for example on the host side. In other words, the DMA hardware receives a descriptor including the extra data, but a next instance, for example on the host side, receives an adjusted descriptor corresponding to the actual data length without dummy data added. Therefore, subsequent instances essentially do not notice the added dummy data, but process the data in a regular way.

Figure 5:
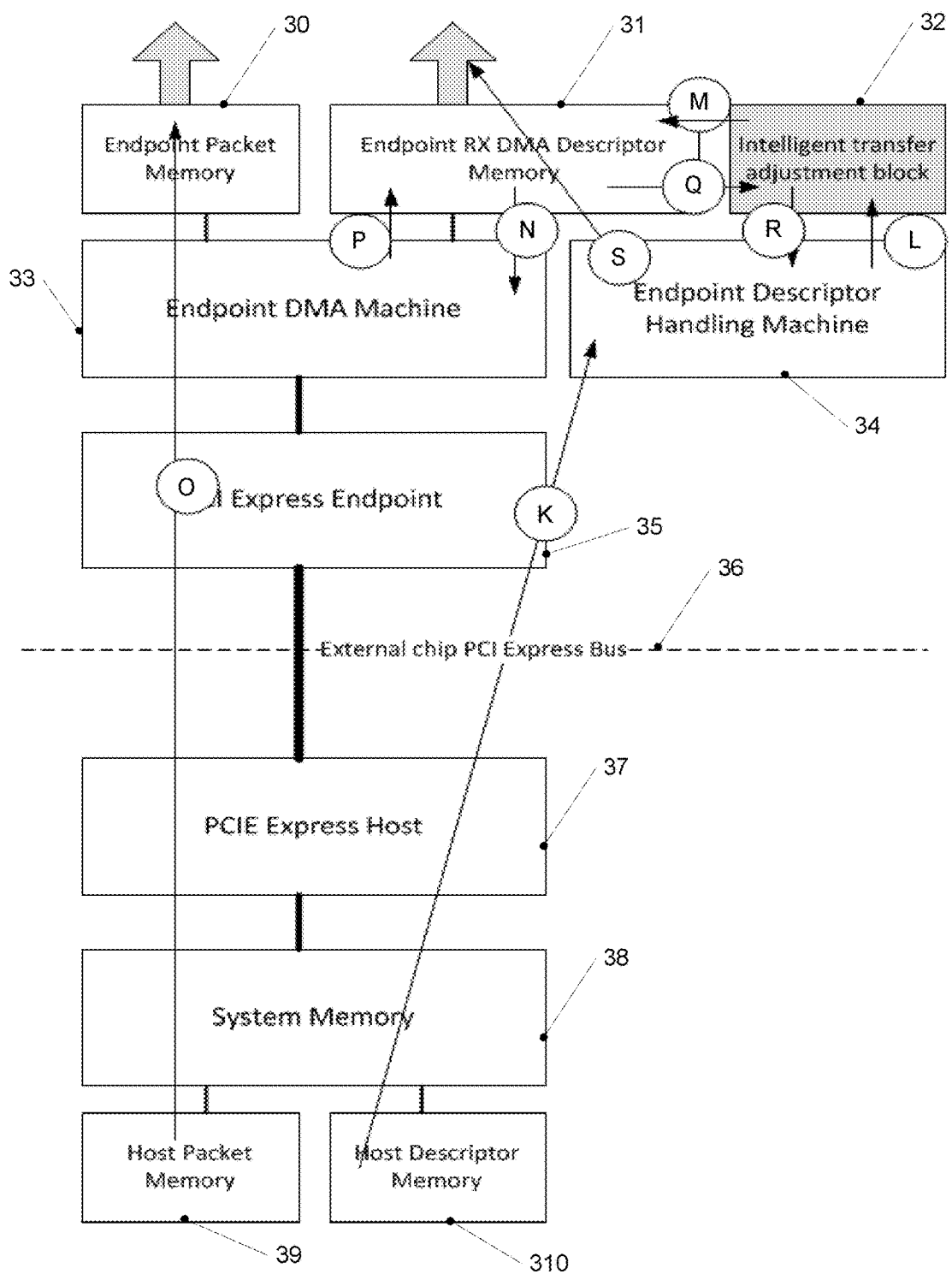
FIG. 5 illustrates operation of the embodiment of FIG. 3 when receiving data.
Figure 7:
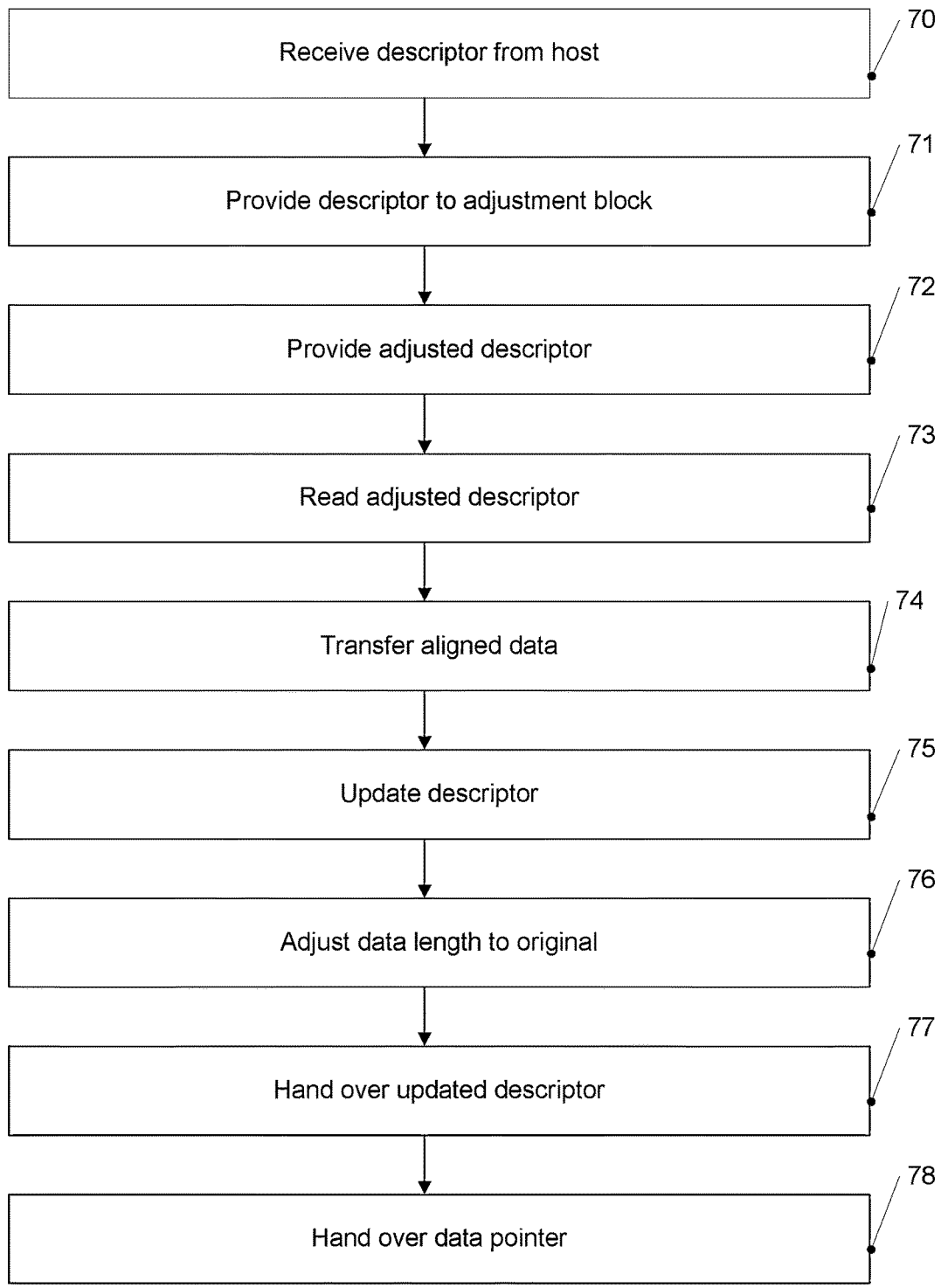
FIG. 7 illustrates an embodiment of a method for receiving data.

Next, with reference to FIGS. 5 and 7, receiving data at the express endpoint from a host using the system of FIG. 3 as an example will be described. While a method of FIG. 7 is represented as a series of acts or events, as already explained for the method of FIG. 6, the order in which the acts or events are described is not to be construed as limiting. Moreover, reference to FIG. 5 is merely given to illustrate the method of FIG. 7 further, and the method of FIG. 7 may also be applicable to other systems than the one shown in FIG. 3. In other embodiments, some of the depicted acts or events may be omitted.

At 70 of FIG. 7, and as indicated by an arrow K in FIG. 5, the endpoint device receives a descriptor from a host side. For example, as illustrated in FIG. 5, the descriptor may be transferred from host descriptor memory 310 to endpoint descriptor handling machine 34. This may be done the regular way, i.e. the descriptor may be a regular descriptor as in conventional PCIe systems.

In conventional systems, this descriptor would then be provided to endpoint DMA machine 33 to enable endpoint DMA machine 33 to retrieve data from the host corresponding to the descriptor. In embodiments, instead at 71, the descriptor is provided to adjustment block 32, as indicated by an arrow L in FIG. 5. In case the transfer adjustment block detects that the length of the data to be transferred, as indicated by the descriptor, does not correspond to a multiple of a DWORD length, the transfer adjustment block adjusts the descriptor by adding dummy data, for example dummy data bytes, such that the descriptor refers to data corresponding to a multiple of a DWORD length. In other words, a data pointer of the descriptor may be aligned to DWORD length.

At 72, the adjusted descriptor is provided to endpoint memory 31 as indicated by an arrow M in FIG. 5, which in this case serves as a received descriptor memory. At 73, DMA machine 33 then reads the adjusted descriptor, as indicated by an arrow N.

At 74, the DMA machine then transfers data according to the adjusted descriptor, i.e. DWORD length aligned data, from a host side memory like host packet memory 39 to an endpoint memory like endpoint packet memory 30. This is indicated by an arrow O in FIG. 5.

At 75, the descriptor is then updated to reflect the completed transfer, as indicated by an arrow P in FIG. 5.

At 76, as indicated by an arrow Q in FIG. 5, intelligent transfer adjustment block 32 receives this updated descriptor and adjusts the data length back to the original length (without dummy data).

At 77, this adjusted descriptor is then handed over to the endpoint descriptor handling machine as indicated by an arrow R in FIG. 5. Based on the updated descriptor, endpoint descriptor handling machine as indicated by arrow S in FIG. 5 at 78 then hands over a corresponding data pointer corresponding to the original length to subsequent processing stages which use the data. By adjusting the data length back to the original length, the DWORD alignment is transparent to subsequent processing stages, i.e. due to the adjusted pointer handed over at 76 subsequent stages for example read only data corresponding to the original (unadjusted) length from endpoint packet memory 30. Therefore the DWORD alignment is used only for the transfer, essentially without being noticed by subsequent stages.

While in FIGS. 3 to 7 communication between a host device (for example root complex) and an endpoint is illustrated, techniques disclosed herein may also be applicable to communication between PCIe endpoints.

Figure 8:
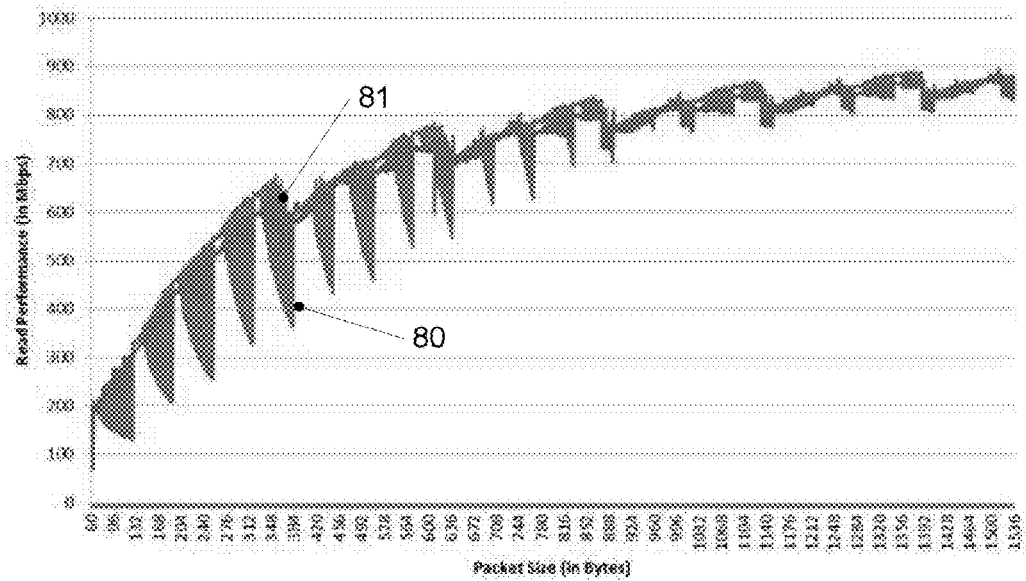
FIGS. 8 and 9 illustrate performance in comparative systems.
Figure 9:
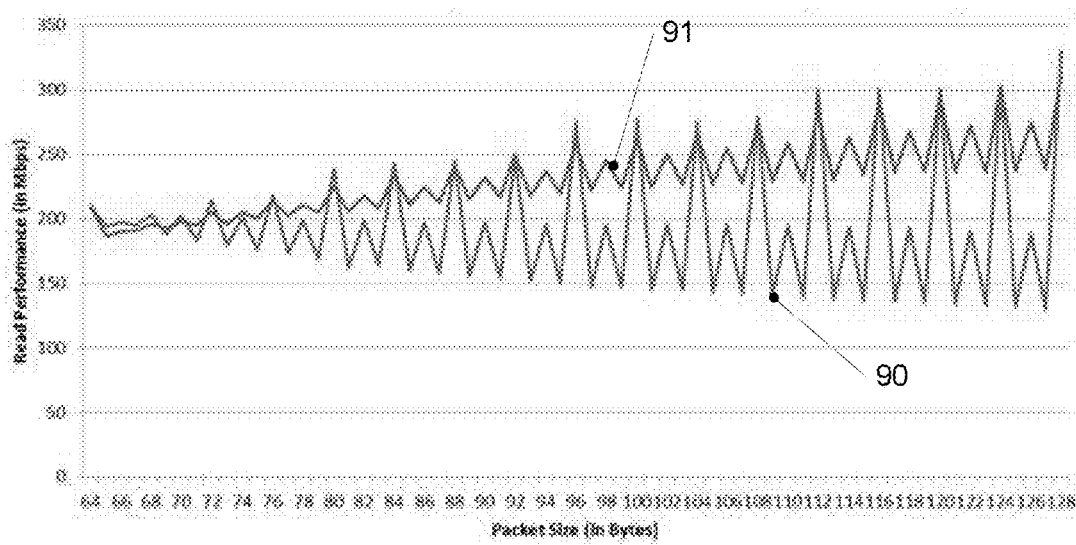
Figure 10:
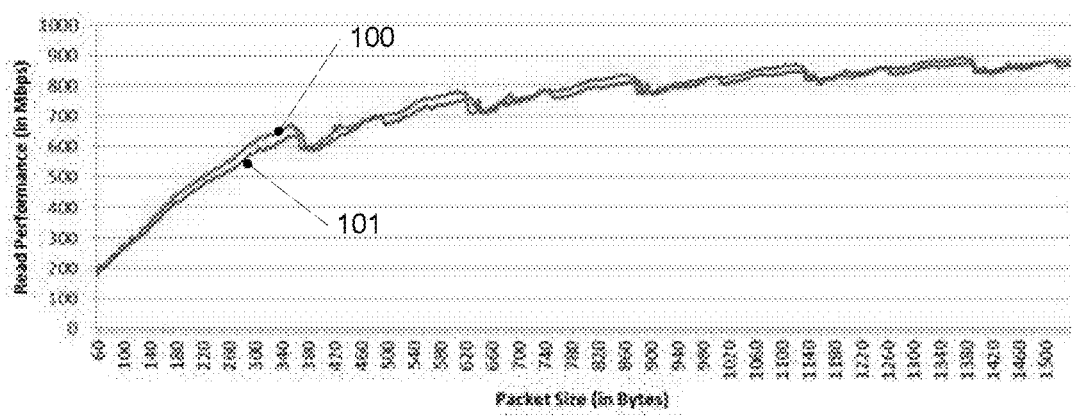
FIG. 10 illustrates performance in a system according to an embodiment.

To illustrate the effect of techniques disclosed herein, FIGS. 8 and 9 illustrate an example performance for comparative systems without DWORD alignment adjustment. In FIGS. 8 and 9, a read performance of a PCIe device is plotted over a packet size in bytes of packets to be transferred. Curves 80 and 81 in FIG. 8 and curves 90 and 91 in FIG. 9 show results for two different comparative systems. As can be seen, depending on the packet size (corresponding for example to the data unit sizes in FIG. 2) the performance varies, and for certain sizes significant performance drops occur. FIG. 10 illustrates an example embodiment using DWORD length aligned data transfer as discussed herein. Curves 100 and 101 again show results for two different systems. As can be seen, performance drops as illustrated in FIGS. 8 and 9 for specific packet sizes are essentially suppressed.

Conventional PCIe devices enabling writing and reading data from a device, for example endpoint, to another device, for example route complex, via an address map. In embodiments, as explained above, for aligned data transfer, this address map is essentially modified.

In a PCIe system, a root complex for example at start-scans, the PCIe connections for the presence of devices, also referred to as endpoint. The transfer of data between these PCIe devices is based on transaction layer packets. The data written or read via PCIe connections are therefore partitions into transaction layer packets. In embodiments, the data is aligned to a multiple of a DWORD length, for example by inserting dummy bytes, for example prior to performing the transaction layer packets.

The above-described embodiments serve merely as example, and are not to be construed as limiting.

What is claimed is:

1. A Peripheral Component Interconnect express (PCIe) device, comprising:
   a transfer adjustment device adapted to align a length of data to be transferred via a PCie link to a multiple of a double word (DWORD) length,
   wherein aligning the length comprises modifying a descriptor.

2. The device of claim 1, wherein the transfer adjustment device is adapted to operate above a transaction layer of the PCie device.

3. The device of claim 1, wherein the device comprises a PCie endpoint device.

4. The device of claim 1, wherein the transfer adjustment device is adapted to adjust the descriptor to an original length of the data after the transfer, and provide the adjusted descriptor for further processing of the data after the transfer.

5. The device of claim 1, wherein the aligning comprises dynamically aligning the length of data to be transferred via a PCie link to the multiple of a double word (DWORD) length.

6. A Peripheral Component Interconnect express (PCie) device, comprising:
   a transfer adjustment device adapted to align a length of data to be transferred via a PCie link to a multiple of a double word (DWORD) length,
   wherein the device comprises a direct memory access (DMA) device adapted to perform the transfer based on the aligned length.

7. Peripheral Component Interconnect express (PCie) device, comprising:
   a transfer adjustment device adapted to align a length of data to be transferred via a PCie link to a multiple of a double word (DWORD) length,
   wherein the transfer adjustment device is adapted to align the length by adding a number of dummy bytes to data to be transferred.

8. The device of claim 7, wherein the number of dummy bytes is between 1 and 3.

9. A method, comprising:
   in a Peripheral Component Interconnect express device, aligning a length of data to be transferred to an integer multiple of a double word (DWORD) length,
   wherein the aligning comprises modifying a descriptor.

10. The method of claim 9, wherein the method comprises transferring the data based on the modified descriptor.

11. The method of claim 10, further comprising, after the transferring, adjusting the modified descriptor to an original length of the data, and providing the adjusted descriptor for further processing of the transferred data.

12. The method of claim 9, wherein the aligning comprises dynamically aligning the length of data to be transferred via a PCie link to the multiple of a double word (DWORD) length.

13. A method, comprising:
   in a Peripheral Component Interconnect express device, aligning a length of data to be transferred to an integer multiple of a double word (DWORD) length,
   wherein said aligning comprises adding dummy bytes.

14. A method, comprising:
   in a Peripheral Component Interconnect express device, aligning a length of data to be transferred to an integer multiple of a double word (DWORD) length,
   wherein the aligning comprises modifying an address map.

* * * * *